(12) United States Patent
Andall

(10) Patent No.: US 11,547,945 B2
(45) Date of Patent: Jan. 10, 2023

(54) CONTENT GENERATION SYSTEM

(71) Applicant: Sony Interactive Entertainment Inc., Tokyo (JP)

(72) Inventor: Hogarth Andall, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 15 days.

(21) Appl. No.: 16/362,789

(22) Filed: Mar. 25, 2019

(65) Prior Publication Data

US 2019/0299108 A1 Oct. 3, 2019

(30) Foreign Application Priority Data

Mar. 28, 2018 (GB) ...................................... 1804993

(51) Int. Cl.
| | |
|---|---|
| *A63F 13/79* | (2014.01) |
| *A63F 13/798* | (2014.01) |
| *A63F 13/63* | (2014.01) |
| *A63F 13/85* | (2014.01) |
| *A63F 13/31* | (2014.01) |
| *A63F 13/35* | (2014.01) |

(52) U.S. Cl.
CPC .............. *A63F 13/85* (2014.09); *A63F 13/31* (2014.09); *A63F 13/35* (2014.09); *A63F 13/63* (2014.09); *A63F 13/79* (2014.09); *A63F 13/798* (2014.09)

(58) Field of Classification Search
None
See application file for complete search history.

(56) References Cited

U.S. PATENT DOCUMENTS

| | | | |
|---|---|---|---|
| 2006/0046854 A1 | 3/2006 | Arevalo Baeza | |
| 2009/0253517 A1* | 10/2009 | Bererton | A63F 13/63 |
| | | | 463/42 |
| 2012/0122592 A1* | 5/2012 | Stafford | A63F 13/67 |
| | | | 463/43 |
| 2018/0243656 A1* | 8/2018 | Aghdaie | A63F 13/67 |
| 2018/0345152 A1* | 12/2018 | Duan | G06F 16/7867 |

FOREIGN PATENT DOCUMENTS

EP        2530932 A2    12/2012

OTHER PUBLICATIONS

Combined Search and Examination Report for corresponding UP Application GB1804993.2, 3 pages, dated Sep. 25, 2018.

(Continued)

*Primary Examiner* — Kang Hu
*Assistant Examiner* — Peter J Iannuzzi
(74) *Attorney, Agent, or Firm* — Matthew B. Dernier, Esq.

(57) ABSTRACT

A content-generation guidance system for assisting a user in generating digital content, the system comprising a content analysis unit operable to analyse a first set of pre-existing user-generated content to identify one or more aspects of the content, a correlation identification unit operable to identify a correlation between the one or more identified aspects of the first set of content and user ratings of that content, and a content modification unit operable, when a user is generating new digital content, to identify one or more aspects of the new digital content for modification in dependence upon the identified correlation or correlations.

13 Claims, 3 Drawing Sheets

(56) References Cited

OTHER PUBLICATIONS

Examination Report for corresponding GB Application No. GB1804993.2, 4 pages, dated Feb. 17, 2021.
Examination Report for corresponding GB Application No. 1804993.2, 6 pages, dated Sep. 8, 2021.
Communication Pursuant to 94(3) for corresponding EP Application No. 18215655.4, 8 pages, dated Aug. 25, 2021.
F. Chevalier, S. Huot and J. Fekete, "WikipediaViz: Conveying article quality for casual Wikipedia readers," 2010 IEEE Pacific Visualization Symposium (PacificVis), 2010, pp. 49-56, Mar. 2, 2010.

* cited by examiner

CONTENT GENERATION SYSTEM

BACKGROUND OF THE INVENTION

Field of the Invention

This invention relates to a content generation system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Traditionally, computer games and other entertainment content (such as movies or novels) have been provided to users via physical media; however it has become increasingly common to provide such content using other methods. For example, digital media may be purchased from online stores and downloaded via an internet connection. One example of such a store is the PlayStation® Store, which allows users to purchase games, game add-ons, and film and television content and then download this content.

Such a distribution model has lowered the costs and removed many of the problems of distributing digital content; as a result, the amount of user-generated content being authored and distributed has increased significantly. Indeed, a number of games appear to rely heavily upon this in order to add longevity to a game; it is common for games to provide a core storyline through which a player can progress, and then allow a player to generate their own content to add more levels for themselves and others to play.

However, the influx of available user-generated content can have many drawbacks. Instead of digital content being designed by a professional and undergoing many playtests before release, user-created digital content is often created by the average player who may have very little game design experience and will not have a dedicated quality-control process. As such, the average quality of user-generated content is likely to be relatively low. This is undesirable for both players (who may feel that their time is wasted in playing through this content) and the game developers (who may feel that a player's opinion of the game could be negatively affected by the experience).

It is therefore desirable to improve the quality of the user-generated content that is made available to the player-base.

Similar problems may exist in other forms of digital content, rather than simply being limited to user-generated game content, as large numbers of people generate other forms of content that is shared online. For example, user-created videos and songs are widely available and many self-published books are available online. As with user-generated game content, there can be a rather large disparity in the quality of content that is generated.

While a moderation process could be implemented that would seek to reduce the amount of low-quality content that is made available, this is a time-consuming process that would be unmanageable in view of the amount of content that is generated on a daily basis.

It is in the context of the above problems that the present invention arises.

SUMMARY OF THE INVENTION

Various aspects and features of the present disclosure are defined in the appended claims and within the text of the accompanying description and include at least a content generation guidance system and method.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

While the Figures generally show examples of an implementation of the disclosed system and method in the context of the generation of content for a computer game, it should be apparent from the below description that the disclosed system and method may be equally applicable to other types of user-generated content.

Figure 1:
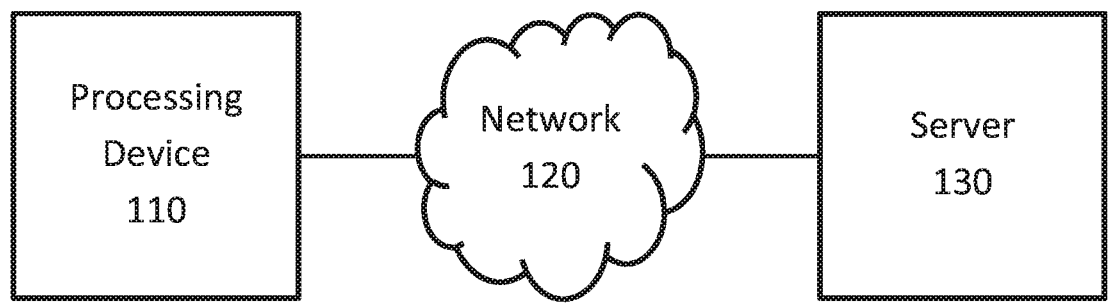
FIG. 1 schematically illustrates content generation and hosting system.

Referring now to the drawings, wherein like reference numerals designate identical or corresponding parts throughout the several views, FIG. 1 schematically illustrates a content generation and hosting system 100. This system comprises a processing device 110, a network 120 and a server 130.

The processing device 110 may be any suitable device for receiving user inputs and performing processing. For example, a dedicated games console such as the Sony® PlayStation® 4 may be used, or a more general processing device such as a mobile phone or PC. The processing device 110 is operable to communicate with the server 130 via the network 120 (for example, via an internet connection).

The server 130 is operable to store information and execute processing related to an application that is executed by the processing device 110. The server 130 may also be operable to provide a library of digital content, in some embodiments. While only one server 130 is shown, of course any number may be accessed by the user of the processing device 110.

A user of the processing device 110 may provide inputs to the processing device 110 in order to control the generation. The actual generation of the content may be affected by processing performed at either the processing device 110 or at one or more servers 130, or a combination of the two. In some embodiments, two or more users may collaborate by providing either separate inputs to a single processing device 110 or each user may be provided with a separate processing device 110 each connectable to a single content generation processing application or the like.

One example of software that may be executed at the processing device 110 is that of a game's in-built editor tool that enables the user to generate new content such as maps or game levels. Of course, rather than using an in-built editor a more general design tool could be utilised that generates content for importing into a game—for instance, a game may be able to accept an image or a file generated using a CAD tool as an input from which to generate new content.

Alternatively, or in addition, a video editing suite, image manipulation tool, audio generation tool and/or word-processing application may each be executed to enable the user to generate and/or edit content of the corresponding format. In some embodiments the content that is generated could be a digital model that acts as a blueprint for a 3D printed model, in which case a 3D modelling tool may be executed.

While the execution of the software may be performed at the processing device 110, it is possible of course that the processing is performed by the server 130. For example, resources for the execution of the software may be stored online, and the processing device 110 may simply act as a client for the user to be able to access this online content.

Figure 2:
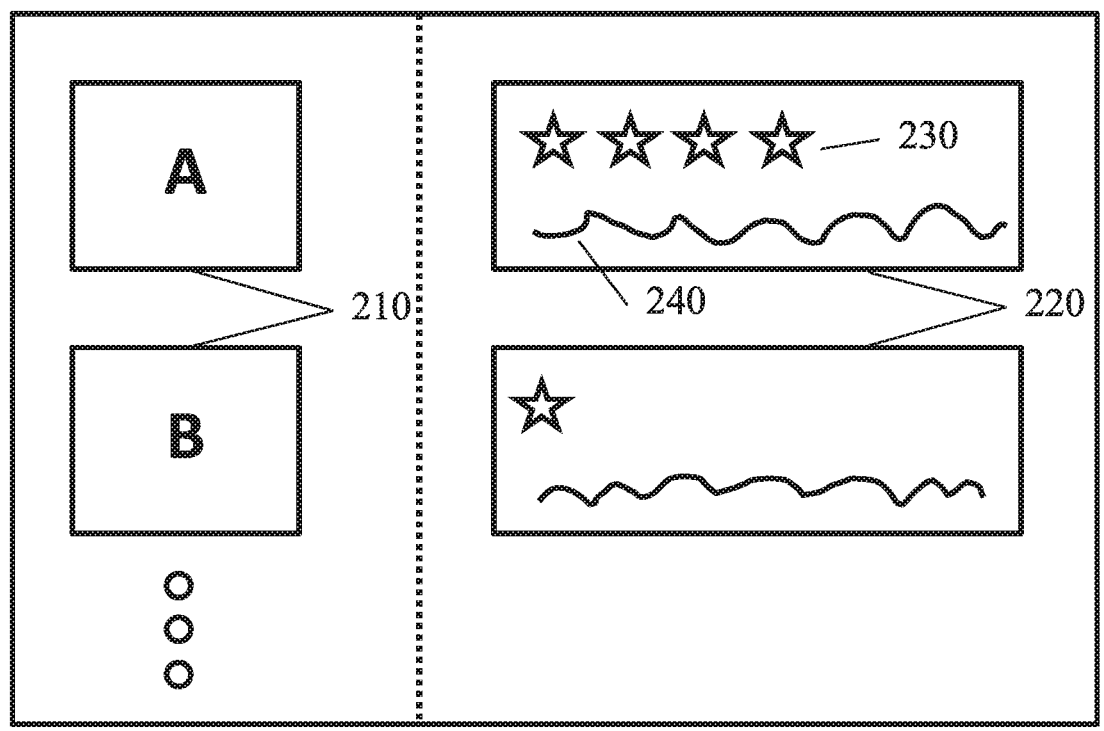
FIG. 2 schematically illustrates a content obtaining display.

FIG. 2 illustrates an example of a display screen 200 that may be used by a user to obtain content. For example, this screen may be representative of an online store or another online content distribution service, such as one provided by an 'on-line community' portal within a videogame.

The display screen 200 shows two pieces of available content 210 (marked A and B, although in practice a display icon or a title or the like would be provided instead to indicate what the content is), along with associated reviews 220. Each of these reviews 220 comprises a rating 230 and a written review or summary 240.

The available content 210 may be any suitable item of digital content; for example, additional content for a game (such as maps or levels), music track, video, or 3D model. The list of content may comprise more than one type of content, such that contents A and B may be a video and a 3D model respectively, for example.

The reviews 220 may be a single user's review of each piece of content, or a curator's review of each piece of content, for example. The single user could be chosen at random from the users that have rated the content, or it could be a favoured user (such as a friend, or a user who has been identified as having similar taste in content). Of course, the selected reviewer may be different for each piece of content. The rating 230 and the written portion 240 may be not relate to the same review; for example, an average rating and an exemplary summary may be provided.

In some embodiments, the rating 230 is an aggregate of the reviews of each of the users that have reviewed the content; this aggregation may be weighted in some way so as to account for user influence or relevance of the reviewer to the user who is viewing the available content 210, for example.

In the example of FIG. 2, it is shown that content A is well-rated (four stars) while content B is poorly-rated (one star); while stars are used as overall ratings in this example, any suitable scale may be used. Indeed, in some examples it is considered that the ratings may comprise one or more values that relate to different characteristics of the content. For example, the categories of 'difficulty', 'replayability', 'fun' and 'appearance' could be used to describe the content, with each category having a different associated rating. It is also possible for viewers to suggest an optimum number of players, and provide suitable tags to describe the content.

The review/summary 240 in such a case may be a 'most helpful' review (as voted by users or selected by a curator, for example) or a selection of keywords that summarise at least a subset of the reviews. For example, the writing 240 could comprise a list of the most frequent adjectives used in the reviews. In this case, it would be expected that the reviews of content A would comprise a greater number of positive adjectives than negative, while the reviews of content B would comprise a greater number of negative adjectives than positive.

Figure 3:
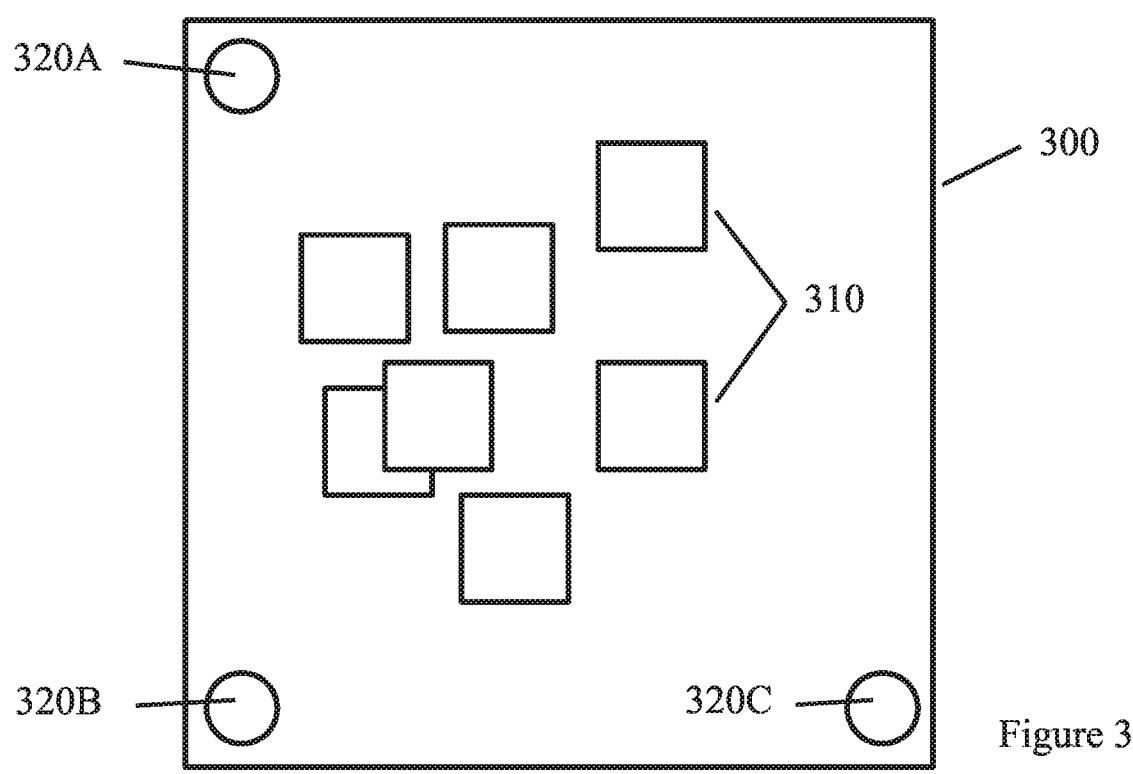
FIG. 3 schematically illustrates a plan view of a game environment.

FIG. 3 schematically illustrates an example of a plan view of a map generated by a user for use as a game level. Such a map may be an example of the available content 210 of FIG. 2. In this example, the in-game environment 300 comprises a number of objects 310 in addition to three players 320A, 320B and 320C (referred to collectively as players 320).

Of course this is a simplified arrangement that may only be applicable to a particular group of games, such as first-person shooters. The actual design of the map (or other user-generated content) may be selected freely so as to be relevant to the application for which the content is designed.

The in-game environment 300 may be analysed by a content analysis unit located at the processing device 110 or the server 130 so as to identify one or more aspects of the content. Examples of such aspects include:

the size of the virtual environment 300;
the number, size, types, movement, and/or distribution of the objects 310;
the number of players 320;
the positions of the starting positions of the players 320;
the occurrence of predetermined events and their content;
the colours or lighting used in the environment; and/or
the difficulty or actions associated with non-player characters.

Of course, any number of other aspects for identification could be considered—the above list should not be considered to be limiting.

The identification of an aspect may comprise the identification of which aspects are suitable for consideration in the context of that piece of content (for example, the above list would not be suitable for music tracks, and only some of the list would be suitable for video content). Alternatively, or in addition, the identification may comprise a measurement of a value associated with one or more of the aspects. For example, a size of the environment may be measured (in pixels, in-game measurements, or simply a categorisation of 'small' through to 'large', for example), and a number of objects in the environment may be counted.

As noted above, content to be analysed may extend beyond virtual environments such as in-game maps. As such, the analysis of content may vary in dependence upon what the content is that is being analysed, both in terms of how the analysis is performed and the aspects that are identified for the content as a result of the analysis.

For instance, if the content is a music track or some other audio then an analysis of the audio components is performed. Features such as tempo, duration, loudness, frequencies used, whether vocals are present may all be identified, and categorisations (such as determining a genre to which the audio content belongs) may also be performed.

If the content is instead video content, then the analysis would again need to be different to that described above. In some examples, file information for the video is identified as a part of the analysis—this may include information such as the duration, resolution, and file format of the content.

Alternatively, or in addition, analysis of the content of the video itself may be performed. For example, object recognition techniques could be applied to one or more image frames in the video content to identify one or more characters or objects shown in the video. Techniques could also be employed that are able to identify aspects of the content as described above with reference to the analysis of the virtual environment.

Such identifications may be performed for all or at least some of the available digital content, so as to be able to characterise the content in terms of one or more of these aspects. In addition to this, the rating of each piece of content may be considered, and correlations between particular aspects (and/or their values) and the rating may be identified. Of course, such a correlation may be dependent upon one or more aspects in combination—for example, a large environment may be considered bad if there are fewer players and/or objects, but good if there is a larger number of players and/or objects. Therefore while the aspects may be considered on an individual basis, it may be advantageous to consider each in turn.

In view of the complexity of the correlations that may be present, there may be significant advantages in employing a machine learning or artificial intelligence based arrangement. Such arrangements may be particularly well-suited to detecting patterns in the available information, and may therefore be able to identify correlations in an effective manner. Such an implementation could also be designed so as to identify further aspects for consideration, and/or determine an appropriate weighting to enable the correlations to be ranked in terms of their strength and/or direction.

For example, a statistical analysis may be performed on the correlations so as to determine how strong the correlation is (which may be considered a measure of how likely a change in aspect is likely to affect the rating) and how valuable the correlation is (which may be considered a measure of how much a modification of a particular aspect will affect the rating). For example, if a linear correlation were identified then the strength of the correlation (such as an r-squared value) and the value of the correlation (the gradient/direction of the line) could both be identified. Of course, non-linear correlations may also be identified, and appropriate descriptors for non-linear correlations may be used in that case.

An example of a suitable arrangement is that of an artificial neural network, although any suitable implementation that is operable to describe inputs parametrically and identify patterns may be useful, including conventional rule-based statistical analyses. As an example of a typical implementation, such a system could be trained using inputs representing aspects and/or values associated with one or more aspects, to output observed, ratings and hence model the correspondence and predict future ratings from new inputs.

It should be appreciated that a number of different correlation models may be generated; for example, it may be possible to identify several groups within the content that are each different and yet still well-rated despite their differences.

As noted above, such a method may be applied in view of several other types of user-generated content.

For example, the frequency profile, volume, tempo, duration and/or any other aspect of a music track could be measured and correlations derived that identify links between particular values of these aspects (or combinations of the aspects) and well-rated content. Modifications could be to exclude particular volume/frequency combinations, for example, or any other aspect (or combination of aspects).

In the case of video content, the lighting, duration, aspect ratio, number/type of characters, dialogue and/or volume of the video content could all be analysed, to provide some examples of aspects that may be considered. There may be limits on how many aspects may be identified for filmed video content, but if the video content has been generated digitally (for example, using a game engine or the like to act out a scene that is output as a video) it may be possible to identify a greater number of aspects. It is also considered that metadata associated with content may also be analysed. Modifications could be to modify properties of the video (such as brightness, contrast or colour grading), or to suggest a reshoot of a scene with different parameters or set-ups.

In the case of written content, paragraph length, word length, sentence length, number of characters, number of chapters and the number of unique words could all be analysed as aspects of the content. These aspects may each be indicators of how readable the content is, or how easy it is to follow the story, for example. Modifications that may be suggested are a varying in chapter length, or the use of a more varied vocabulary, for example.

For 3D models, such as those of new in-game characters or those that serve as blueprints for 3D printing, aspects such as height, shape, materials, resolution or the like may all be considered. Modifications that may be suggested could include a rescaling of the model, or an increase/reduction in resolution of different areas as appropriate.

For level/map design in a game, the positioning and types of environmental elements used to create a new level by a user may be considered. Hence for example positioning different hazardous objects close to each other may have a strong correlation with negative reviews, and similarly positioning reward objects far apart or in association with particular environmental features may result in negative views. Meanwhile certain combinations of environmental elements, and/or certain distributions, permutations, layouts or arrangements of environmental elements may correlate with positive or negative reviews.

By identifying such correlations, it is envisaged that a user is able to be assisted when developing content of their own. For example, a user that is creating a new map for a game may be assisted in the placement of objects or the like in order to improve the quality of the content, by using their selection and/or positioning of environmental elements as a basis to determine a positive or negative review correlation for similar selections and/or positions of environmental elements, and providing feedback accordingly during the level/map generation process. In this way, over time, the quality of user-generated content may be increased.

As noted above, several different groups within the content may be identified such that different models of correlations are derived. Indeed, it may even be desirable to identify a plurality of such groups so as to ensure that the correlations do not point towards a single 'best' solution—in that way, innovation and variety may still be encouraged even when users are guided towards improvements based upon existing user-generated content.

Figure 4:
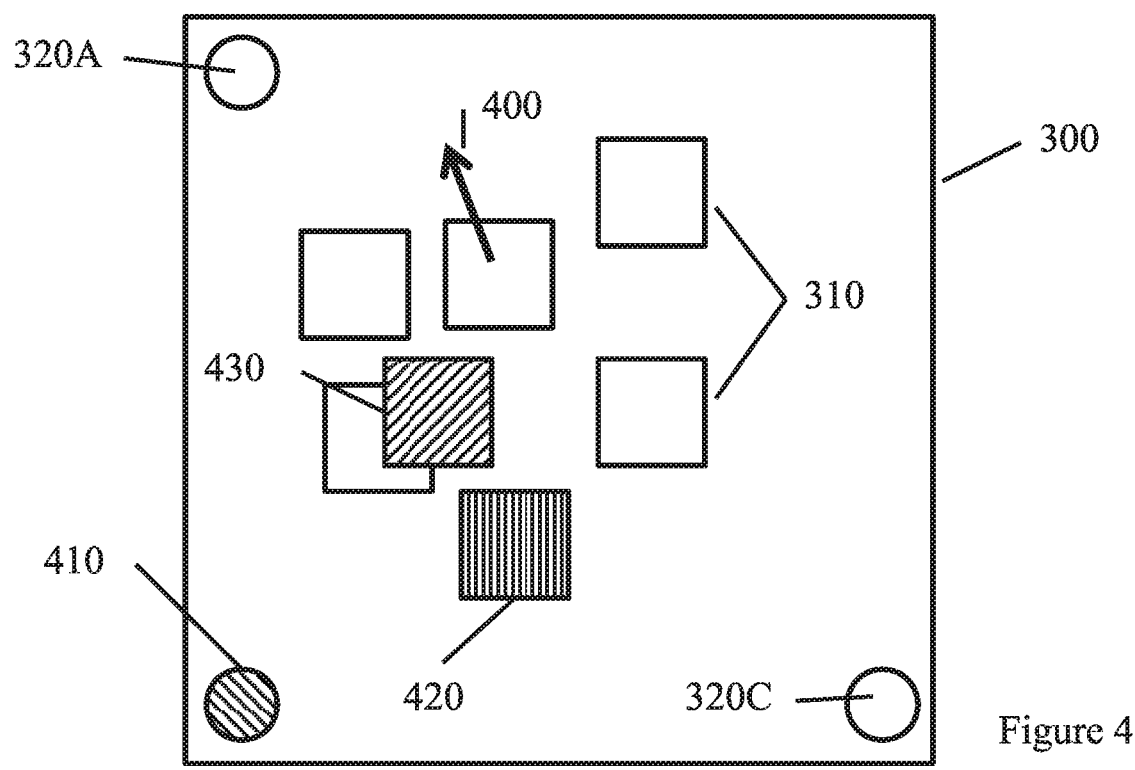
FIG. 4 schematically illustrates a plan view of a game environment with additional indicators.

FIG. 4 schematically illustrates an example of the use of the correlation data in the context of the virtual environment 300 of FIG. 3. While it is shown here that a user is provided with indications of improvements that could be affected, it is possible that a number of the improvements could be automatically applied (for example, all improvements of a specific type or any improvements that involve a less-than-threshold change).

When referring to improvements, it is intended that this should relate to an expected increase in the average rating that would be achieved by the content; of course, the content may not be improved in an objective and measurable manner due to the subjective nature of user opinion—it often cannot be said that one option is always better than another. An improvement is therefore a modification to the content that would be expected to increase the average user rating that would be achieved by the content when made available.

A first suggested improvement is illustrated by the arrow 400, which indicates that the map may be improved by moving one of the objects 310 in the indicated direction. Such an improvement may be identified in response to a detection of object density, for example, or the identification of a minimum desirable distance between objects, or a measure of object distribution uniformity (or lack thereof) within the map or a part thereof. A further possible aspect that may be considered is that of an average distance of line of sight within the environment, for example.

The second suggested improvement is indicated by a hatched player character 410; the suggestion may, for example, relate to the removal of the player or the modification of their starting position. For example, the map 300 may be considered to be of a size more suited to two players, or it may be considered desirable that players are not able to see each other at the start of the game. Of course, the selection of the hatching (or other shading/highlighting/other method of indication) for the character 410 may be indicative of the suggested improvement; alternatively, the hatching may simply indicate that an improvement suggestion is available and the player is able to select the character 410 in order to receive further information.

It will be appreciated that actual players may not be included during the design phase, possibly except for an avatar intended to assist with the design. However, where a user indicates that a level/map is suitable for a given number of players, such as one, or two or more players, then features of the level/map may be assessed based on correlations for similar features in maps played by that number of players.

The third and fourth suggested improvements are indicated by the hatched objects 420 and 430. As noted above, the selected hatching may be indicative of the suggestion that is being made.

For example, the hatched object 420 may be identified as an object for deletion. This could be in response to a determination that there are too many objects 310 in the environment 300, or a determination that that particular object 420 is not suitable for the environment 300 (for example, for aesthetic reasons). Alternatively it may be identified for possible substitution for another object more commonly found in association with nearby objects within the user's level/map design, within levels having positive reviews.

The hatched object 430 may be identified for an improvement due to its overlapping with another of the objects 310. For example, the object 430 may be balanced on top of the object 310; this may make the object 430 too high, or obstruct a player's progress if they wish to jump between the tops of the objects 310.

In another example, the object 430 and the object 310 at least partially occupy the same space; this may be appropriate in some cases, but be visually unappealing in others (as such, the type or appearance of each object may be considered). The shape 430 may therefore be highlighted to indicate that it should be moved, reshaped, or made smaller so as to avoid this overlap.

Of course, not all improvement suggestions need be communicated in this way—any suitable visual or audible indication may be provided. For instance, a pop-up may appear on screen (for example, in response to the placement of an object or a user requesting suggestions) that details any suggestions. In some embodiments, an audible of haptic notification is provided instead that indicates that there is a possible improvement, as well as potentially providing information about the nature of that improvement.

In some cases, it may not be possible to communicate suggested improvements in the manner described with reference to FIG. 4. One example of this is in the case of events within game content; events may not be tied to specific objects, and as such there may be no corresponding element to highlight. However, typically an event trigger may nevertheless be indicated within the design interface so that the user can add all such events, even if the trigger is not visible during conventional play. Typically there will be a finite set of events selectable by a user, for example due to the requirement for predefined animation sequences and special effects, and so these event triggers may be considered a separate class of objects and treated in a similar manner to other environmental elements within the level/map. Another example is a behaviour descriptor, such as specifying that an environmental object such as a platform or non-player character moves back and forth by a certain distance or at a certain speed. In such a case, the object, the distance and/or movement path, and the speed of motion may all be potential candidates for correlation with positive or negative reviews, either singly or in combination. Another example of this is the use of sound effects or cut-scenes during playback of the content; again however, indicators of sound or video files may be visibly embedded within the level/map when viewed in a level/map design interface and hence treated in a similar manner. In this case, properties of the video/image/sound may be classified to identify them as developed types, such as for example long duration, low-volume background music versus short duration, high-volume explosion sounds.

In some cases, it may be appropriate to calculate a net gain or likely change in rating due to the complexity of some user-generated content. For example, if there is a high density of a particular object in an area, it could be considered that either a change in the object, movement of the object, or deletion of the object may each have a different impact on the expected rating of the content. It may therefore be advantageous to identify which of these options would likely represent the greatest improvement.

In some cases, a possible change could result in a net loss of expected user rating; for example, the changing of the object may mean that two incompatible objects are placed nearby, or that object diversity has become too high. It may therefore be advantageous to identify which particular change would be most advantageous, and to communicate this to the user, rather than a more general suggestion. For example, rather than only suggesting that a user change an object, the suggestion may be expanded (as noted above) so as to include a list of suggested or undesirable options so as to assist in the decision making.

The identified correlation information may also be utilised in other fashions, in some embodiments.

In a first example, the correlation information may be used to influence content recommendations. For example, content that has a rating that would not be expected based upon a detection of one or more aspects of the content may be preferentially recommended to users. For example, an unexpectedly-well-rated (in that the rating is higher than an analysis of the one or more aspects would predict) piece of content may be recommended as an 'unorthodox choice' or the like, while an unexpectedly-poorly-rated piece of content may be recommended as a 'hidden gem' or the like.

By making such recommendations, the number of ratings that are obtained for these pieces of content may be increased so as to allow an identification of whether the ratings were anomalous or whether the correlation information should be updated so as to accurately predict the rating. The updating of the correlation information may, in some cases, comprise the identifying of a new group within the content, as discussed above. This is an example of an implementation in which recommendations for pre-existing user-generated content are provided to a user in dependence upon a difference between user ratings for the pre-existing user-generated content and a predicted user rating generated based upon the use of identified correlation information.

Another example of an additional use for the correlation information is that of identifying users that are able to create content that is unexpectedly-well-rated. These users may be of particular interest, as they are likely to be the most innovative contributors amongst the users. Once identified, these users could be provided with recognition or incentives to create further content, or encouraged to share creation advice with other content creators.

It will be appreciated that any scheme where correlations with positive reviews are detected and/or learned (depending on the underlying associative mechanism), then content that is initially unexpectedly well rated will in due course become expectedly well-rated because the system updates its statistical model to account for the correlations between the features of those levels and the positive ratings. This encourages continued innovation in new areas.

Meanwhile for user created game levels where a very high user rating also corresponds with an analysis of the level's content, it will be clear that such a level is particularly good, and conversely user created game levels where a very low user rating also corresponds with an analysis of the levels content it will be clear that such level is particularly bad. Hence more generally, a confidence score for ratings could be provided which is indicative of how closely the actual user rating corresponds to the rating derived from the analysis of the level; users wanting to play it safe could select high confidence, high rating levels, whilst users wanting to play something a bit different could select low confidence high rating levels (likely to be unorthodox, but good) or low confidence low rating levels (possible hidden gems). Indeed, these contrary combinations of confidence and rating may be flagged in this way to the user.

Figure 5:
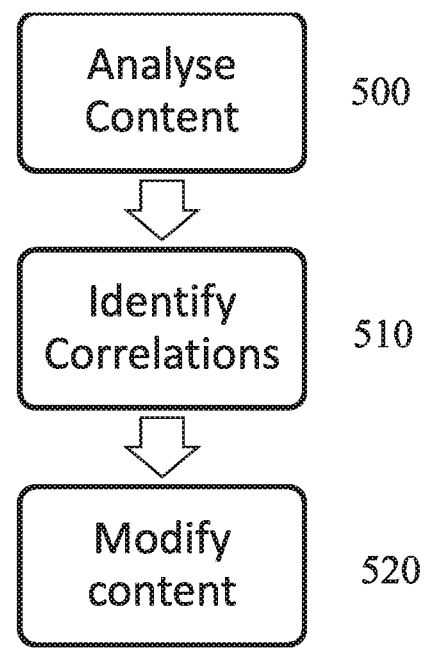
FIG. 5 schematically illustrates a content generation method.

FIG. 5 schematically illustrates a content-generation guidance method for assisting a user in generating digital content. As discussed above, in some embodiments the digital content comprises content for a game; however any other digital content may be suitable for use with this method. In the case that the digital content does comprise content for a game, it may be that the game content comprises one or more virtual environments (such as new maps or levels) comprising one or more virtual objects (such as structures or obstacles).

A step 500 comprises analysing a first set of pre-existing user-generated content to identify one or more aspects of the content. This first set of user-generated content may comprise at least a subset of available content from a library of user-generated content, such as a plurality of maps that are available for download from one or more servers associated with a game or game provider.

A step 510 comprises identifying a correlation between the one or more identified aspects of the first set of content and user ratings of that content. As described above, this may include the identification of aspects of the content that have a correlation with the user rating, as well as the strength and/or direction of the correlation.

A step 520 comprises identifying, when a user is generating new digital content, one or more aspects of the new digital content for modification in dependence upon the identified correlation or correlations (as correlations may be identified for each individual aspect and/or groups of aspects with respect to the user ratings of the content).

In embodiments in which the digital content is game content comprising a virtual environment, identified aspects for modification may relate to the position and/or type of the virtual objects within the virtual environment. As described with reference to FIG. 4, this may comprise the highlighting or marking of specific objects and/or the provision of visual/audio/haptic cues and/or information to the user, for example.

In some embodiments, the step 520 may only be performed for an above-threshold potential ratings gain, for example, or another suitable threshold may be identified. Another suitable threshold may be that of the magnitude of the improvement; for example, if an object would have to move by more than a threshold value then it may no longer represent what the user was trying to achieve, and so a suggestion may not be made.

Figure 6:
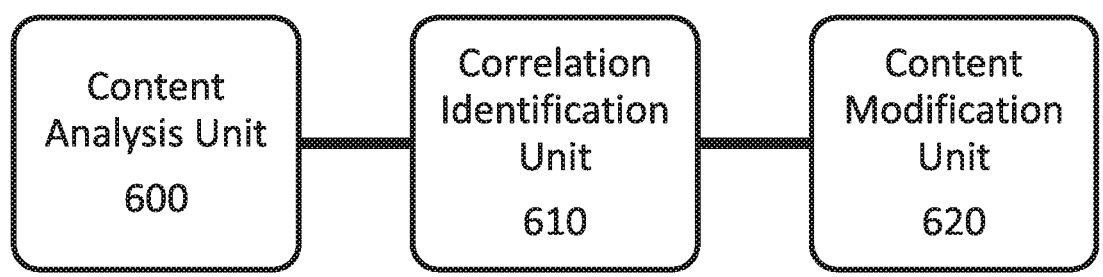
FIG. 6 schematically illustrates a content generation system.

FIG. 6 schematically illustrates a content-generation guidance system for assisting a user in generating digital content. This system comprises a content analysis unit 600, a correlation identification unit 610 and a content modification unit 620.

The system of FIG. 6 may be implemented by one or more processors located at one or more processing devices 110, one or more servers 130, or any suitable combination of these. For example, the content analysis unit and correlation identification unit may be located at one or more servers 130, while the content modification unit is located at a processing device 110.

The content analysis unit 600 is operable to analyse a first set of pre-existing user-generated content to identify one or more aspects of the content. As noted above, this may be any content that is available via an online library of digital content, for example.

The correlation identification unit 610 is operable to identify a correlation between the one or more identified aspects of the first set of content and user ratings of that content. In some embodiments, the correlation identification unit 610 is operable to identify a strength of the correlation and/or a direction of the correlation.

In some embodiments the correlation identification unit 610 may also be operable to identify one or more groupings of the pre-existing user-generated content based upon the identified correlations. In the context of a gaming example, this could be different styles of map, for example, or any other method by which the content may be grouped. The grouping may be based upon the correlation between different aspects of the content, for example, as it may be possible to identify groups based upon this. An example of this is 'maps where feature X and Y work well together' versus 'maps where features X and Y do not work well together', where each group may have entirely different values for a number of the identified aspects.

The content modification unit 620 is operable, when a user is generating new digital content, to identify one or more aspects of the new digital content for modification in dependence upon the identified correlation or correlations. In some embodiments the content modification unit 620 is operable to automatically implement one or more modifications of the one or more identified aspects of the new digital content, while in other embodiments the content modification unit 620 is operable to identify one or more modifications of the one or more identified aspects of the new digital content to the user. Of course, it may be the case that each of these features are implemented in combination—as noted above, threshold values may be established (for example, in terms of the magnitude of the modification or the change in expected user ratings) to determine whether the modification should be automatically implemented or not.

In embodiments in which groupings are identified by the correlation identification unit 610, the content modification unit 620 may be operable to identify a corresponding one of the one or more groups for the new digital content, and to identify the one or more aspects for modification in dependence upon the identified grouping. For example, aspects of the newly-generated content may be identified so as to determine which group is most similar based upon the aspects of the grouped content.

The content modification unit 620 may be operable, in some embodiments, to determine an expectation value of a change in predicted user rating for one or more possible modifications of the one or more aspects of the new digital content. This may be based upon the strength and/or direction of the correlation that may be identified by the correlation identification unit 610, for example. It is possible that the content modification unit 620 is operable to only identify aspects for modification if the determined expectation value is above a predetermined threshold value; for example, if the change in expected rating is too small or if the modification required to obtain a an increase in an expected rating were to be too large.

It will be appreciated that embodiments of the present invention may be implemented in hardware, programmable hardware, software-controlled data processing arrangements or combinations of these. It will also be appreciated that computer software or firmware used in such embodiments, and providing media for providing such software or firmware (such as storage media, for example a machine-readable non-transitory storage medium such as a magnetic or optical disc or a flash memory) are considered to represent embodiments of the present invention.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A content-generation guidance system for assisting any given user among a plurality of users in generating new digital content, the system comprising:
a content analysis unit operable, via automated, computerized analysis, to analyse a first set of pre-existing user-generated content to identify one or more aspects of the first set of pre-existing user-generated content and numerical values associated with the one or more identified aspects, where the first set of pre-existing user-generated content was generated by at least one of the plurality of users;
a correlation identification unit operable, via automated, computerized computation, to numerically compute a statistical correlation between the numerical values associated with the one or more identified aspects of the first set of pre-existing user-generated content and user ratings of the first set of pre-existing user-generated content, where the user ratings of the first set of pre-existing user-generated content were generated by at least one of the plurality of users, where the correlation identification unit is operable to identify a strength of the correlation and/or a direction of the correlation via numerical computation; and
a content modification unit operable, via automated computerized analysis, simultaneously with when the given user is generating the new digital content and simultaneously with when the new digital content is being executed in a digital environment by the given user, to display information to the given user graphically identifying one or more aspects of the new digital content that are determined, through numerical computation during such execution of the new digital content, and as a numerically calculated function of the numerically computed statistical correlation, to result in a likelihood of improving future user ratings of the new digital content when such one or more aspects of the new digital content are modified in a particular way, where the future user ratings are to be generated by at least one of the plurality of users evaluating the new digital content.

2. A system according to claim 1, wherein the new digital content comprises content for a game.

3. A system according to claim 2, wherein the new digital content comprises one or more virtual environments comprising one or more virtual objects.

4. A system according to claim 3, wherein the identified aspects for modification relate to at least one of a position of the virtual objects and a type of the virtual objects within the virtual environment.

5. A system according to claim 1, wherein the correlation identification unit is operable to identify one or more groupings of the first set of pre-existing user-generated content based upon the identified correlations.

6. A system according to claim 1, wherein the content modification unit is operable to automatically implement one or more modifications of the one or more identified aspects of the new digital content.

7. A system according to claim 1, wherein the content modification unit is operable to identify one or more modifications of the one or more identified aspects of the new digital content to the user.

8. A system according to claim 5, wherein the content modification unit is operable to identify a corresponding one of the one or more groups for the new digital content, and to identify the one or more aspects for modification in dependence upon the identified grouping.

9. A system according to claim 1, wherein the content modification unit is operable to determine an expectation value of a change in predicted user rating for one or more possible modifications of the one or more aspects of the new digital content.

10. A system according to claim 9, wherein the content modification unit is operable to only identify aspects for modification if the determined expectation is above a predetermined threshold value.

11. A system according to claim 1, wherein recommendations for pre-existing user-generated content are provided to a user in dependence upon a difference between user ratings for the pre-existing user-generated content and a predicted user rating generated based upon the use of identified correlation information.

12. A content-generation guidance method for assisting any given user among a plurality of users in generating new digital content, the method comprising:

analysing, via automated, computerized analysis, a first set of pre-existing user-generated content to identify one or more aspects of the first set of pre-existing user-generated content and numerical values associated with the one or more identified aspects, where the first set of pre-existing user-generated content was generated by at least one of the plurality of users;

numerically computing, via automated, computerized computation, a statistical correlation between the numerical values associated with the one or more identified aspects of the first set of pre-existing user-generated content analysed in the analysing step and user ratings of the first set of pre-existing user-generated content, where the user ratings of the first set of pre-existing user-generated content were generated by at least one of the plurality of users, where the identifying includes identifying a strength of the correlation and/or a direction of the correlation via numerical computation; and displaying information to the given user, via automated, computerized analysis, simultaneously with when the user is generating the new digital content and simultaneously with when the new digital content is being executed in a digital environment by the given user, where the information graphically identifies one or more aspects of the new digital content that are determined, through numerical computation during such execution of the new digital content, and as a numerically calculated function of the numerically computed statistical correlation, to result in a likelihood of improving future user ratings of the new digital content when such one or more aspects of the new digital content are modified in a particular way, where the future user ratings are to be generated by at least one of the plurality of users evaluating the new digital content.

13. A non-transitory computer-readable storage medium containing computer software, which when executed by a computer, causes the computer to perform a content-generation guidance method for assisting any given user among a plurality of users in generating new digital content, by carrying out actions, comprising:

analysing, via automated, computerized analysis, a first set of pre-existing user-generated content to identify one or more aspects of the first set of pre-existing user-generated content and numerical values associated with the one or more identified aspects, where the first set of pre-existing user-generated content was generated by at least one of the plurality of users;

numerically computing, via automated, computerized computation, a statistical correlation between the numerical values associated with the one or more identified aspects of the first set of pre-existing user-generated content analysed in the analysing step and user ratings of the first set of pre-existing user-generated content, where the user ratings of the first set of pre-existing user-generated content were generated by at least one of the plurality of users, where the identifying includes identifying a strength of the correlation and/or a direction of the correlation via numerical computation; and displaying information to the given user, via automated, computerized analysis, simultaneously with when the user is generating the new digital content and simultaneously with when the new digital content is being executed in a digital environment by the given user, where the information graphically identifies one or more aspects of the new digital content that are determined, through numerical computation during such execution of the new digital content, and as a numerically calculated function of the numerically computed statistical correlation, to result in a likelihood of improving future user ratings of the new digital content when such one or more aspects of the new digital content are modified in a particular way, where the future user ratings are to be generated by at least one of the plurality of users evaluating the new digital content.

* * * * *